G. Hely,
Horse Power.

Nº 21,495.          Patented Sep. 14, 1858.

AM. PHOTO-LITHO. CO. N.Y. (OSBORNE'S PROCESS.)

UNITED STATES PATENT OFFICE.

GORGES HELY, OF ROCHESTER, WISCONSIN.

HORSE-POWER.

Specification of Letters Patent No. 21,495, dated September 14, 1858.

*To all whom it may concern:*

Be it known that I, GORGES HELY, of Rochester, in the county of Racine and State of Wisconsin, have invented a new and useful Improvement in Horse-Powers; and I do hereby declare that the following is a full, clear, and exact description of the construction and operation of the same, reference being had to the annexed drawing, forming part of this specification, in which—

Figure 1:
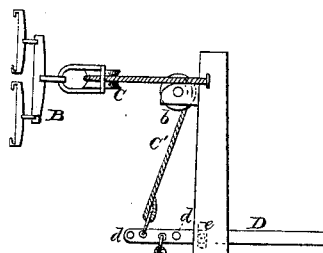
Figure 1:
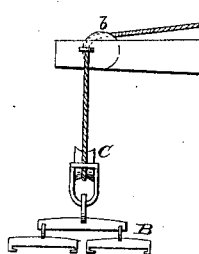
Figure 1:
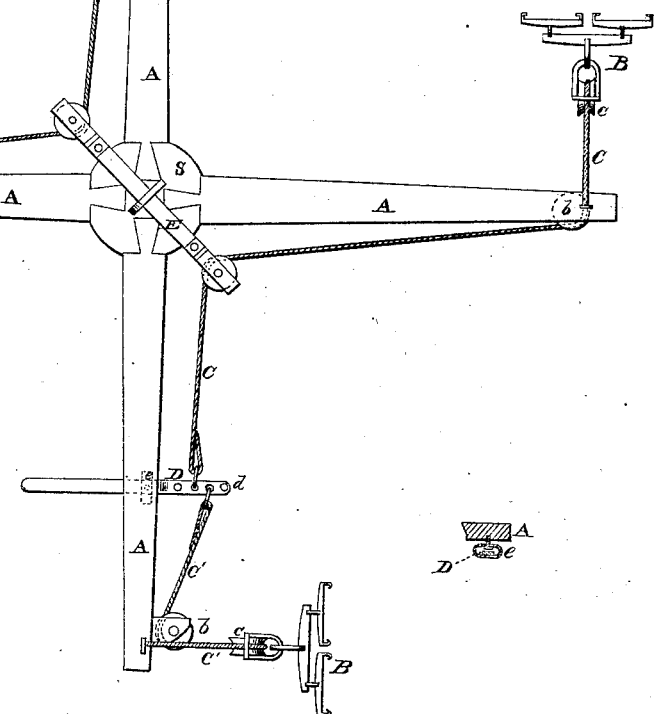
Figure 2:
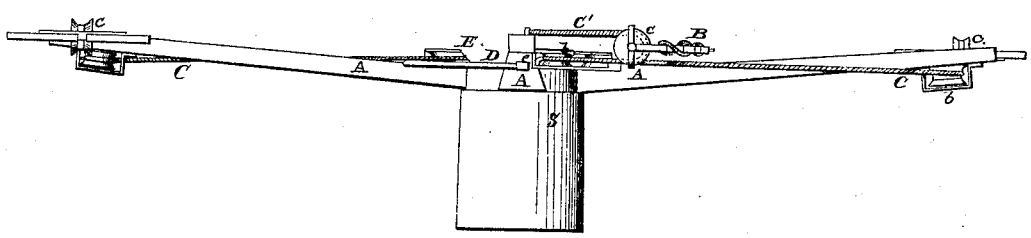

Figure 1 is a top view of the draft arms, shaft, and gearing of a horse power constructed on my plans. Fig. 2 is a side view of the same.

Similar characters of reference in the several figures denote the same part.

The invention here considered has reference to the attaching of the horses to the draft arms of the power, and is designed for equalizing the draft of the several teams. Its nature consists in certain lever connections between the several teams, the arrangement and operation of which will be hereinafter set forth.

In the drawing A A are the draft arms of the power attached to the vertical shaft S. The teams are attached at B B, to cords or chains C C' fastened to the arms at $a$ and passing around pulleys $b$ and $c$. Each pair of cords C C' is connected by hooking into holes $d$ of a lever D. This lever is held by the swinging strap $e$ so that the attachment of the said strap to the arm constitutes the fulcrum of the lever; the lever being free to slide through the strap as circumstances may require. A loose bar E resting upon the head of the shaft S, and having a sheave in each end serves to connect the two systems of cords or chains C C' as shown in Fig. 1.

The operation of this equalizing arrangement is as follows: The chain C C' to which the weakest team is attached will be fastened to the lever D at the greatest distance from the fulcrum so that by acting with a greater arm of lever than the team opposed, the advantage will be in favor of the weak team. The loose bar E serves to transmit the effort of the teams of one system so as to act against the teams of the system opposed. This serves moreover to adjust the arms of lever with which the opposite systems work so that the greatest effective arms of lever shall be in favor of the weakest system, since the strong pair of teams, by drawing the bar E longitudinally, diminish proportionally the effective arm of lever with which they act. If there should be but a single team inferior to the others, then but a single lever D may be used in order that an advantage may be given to the weak team. There may be three of these levers used where no two of the teams are alike in strength; the proper arms of lever being given their attachment.

I do not claim the mere connecting of the several teams, as such is not new. But

I claim—

The combination of the sliding levers D and the loose coupling bar E with the draft chains substantially as set forth.

In testimony whereof, I have hereunto signed my name before two subscribing witnesses.

GORGES HELY.

Witnesses:
 GEO. PATTEN,
 JOHN S. HOLLINGSHEAD.